(12) United States Patent
Kocher

(10) Patent No.: US 11,036,969 B1
(45) Date of Patent: Jun. 15, 2021

(54) GROUP IDENTIFICATION DEVICE

(71) Applicant: Robert Kocher, McLean, VA (US)

(72) Inventor: Robert Kocher, McLean, VA (US)

(*) Notice: Subject to any disclaimer, the term of this patent is extended or adjusted under 35 U.S.C. 154(b) by 242 days.

(21) Appl. No.: 15/932,115

(22) Filed: Feb. 7, 2018

Related U.S. Application Data

(60) Provisional application No. 62/499,921, filed on Feb. 8, 2017.

(51) Int. Cl.
*G06K 9/00* (2006.01)

(52) U.S. Cl.
CPC ..... *G06K 9/00288* (2013.01); *G06K 9/00899* (2013.01); *G06K 9/00926* (2013.01); *G06K 2009/00953* (2013.01); *G06K 2009/00966* (2013.01)

(58) Field of Classification Search
CPC ........... G06K 9/00288; G06K 9/00221; G06K 9/00261; G06K 9/00335; G06K 9/00758; G06K 9/00926
See application file for complete search history.

(56) References Cited

U.S. PATENT DOCUMENTS

| | | | | |
|---|---|---|---|---|
| 5,987,153 A | * | 11/1999 | Chan | G06K 9/00154 340/5.82 |
| 6,944,319 B1 | * | 9/2005 | Huang | G06K 9/00288 382/118 |
| 7,277,891 B2 | * | 10/2007 | Howard | G06K 9/00006 707/707 |
| 7,330,570 B2 | * | 2/2008 | Sogo | G06K 9/00288 340/5.52 |
| 7,769,207 B2 | * | 8/2010 | Olivo, Jr. | G06K 9/00979 348/135 |
| 7,925,887 B2 | * | 4/2011 | Burton | G06F 21/32 713/186 |
| 7,956,890 B2 | * | 6/2011 | Cheng | G06K 9/00771 348/143 |
| 8,254,645 B2 | * | 8/2012 | Okubo | G06K 9/00926 382/118 |
| 8,296,574 B2 | * | 10/2012 | Kosaka | G06F 21/32 713/186 |
| 8,363,951 B2 | * | 1/2013 | Bigioi | G06K 9/00221 382/190 |
| 8,363,952 B2 | * | 1/2013 | Bigioi | G06K 9/00221 382/190 |

(Continued)

FOREIGN PATENT DOCUMENTS

| IN | 201201862 I4 | * | 5/2016 |
|---|---|---|---|
| JP | 2009026235 A | * | 2/2009 |

OTHER PUBLICATIONS

Das, Ravi; "BioCryptography and Biometric Penetration Testing", Jul. 21, 2016; Infosec Institute; <https://resources.infosecinstitute.com/biocryptography-and-biometric-penetration-testing/> (Year: 2016).*

Primary Examiner — John Villecco

(57) ABSTRACT

A device and method for achieving a high probability of match for identifying individuals in a particular group, is provided. The device and method consists of two stages. The first stage compares a biometric template against personnel in an authorized group with a high probability of match standard. In the second stage, in response to no match being made in the authorization group, a search would be conducted against a second group, such as a watch list, with the same or lower probability of match rate.

2 Claims, 7 Drawing Sheets

(56) References Cited

U.S. PATENT DOCUMENTS

| | | | | |
|---|---|---|---|---|
| 8,755,610 B2* | 6/2014 | Holland | G06F 16/583 | |
| | | | 382/218 | |
| 8,832,124 B2* | 9/2014 | Partington | G06F 16/5838 | |
| | | | 707/754 | |
| 9,047,505 B2* | 6/2015 | Yoshio | G06K 9/00288 | |
| 9,235,751 B2* | 1/2016 | Sukegawa | G06K 9/00221 | |
| 9,280,715 B2* | 3/2016 | Stephanson | G06F 21/32 | |
| 9,477,876 B2* | 10/2016 | Sukegawa | G06K 9/00288 | |
| 9,892,576 B2* | 2/2018 | Kursun | G16H 10/65 | |
| 10,380,499 B2* | 8/2019 | Ylipaavalniemi | G06K 9/6262 | |
| 2003/0161507 A1* | 8/2003 | Lawandy | G06K 9/00255 | |
| | | | 382/118 | |
| 2004/0133582 A1* | 7/2004 | Howard | G06K 9/00006 | |
| 2004/0151349 A1* | 8/2004 | Milne | G06K 9/00208 | |
| | | | 382/115 | |
| 2005/0063569 A1* | 3/2005 | Colbert | G06K 9/00275 | |
| | | | 382/118 | |
| 2006/0093208 A1* | 5/2006 | Li | G06K 9/6276 | |
| | | | 382/159 | |
| 2006/0140486 A1* | 6/2006 | Kondo | G06K 9/00248 | |
| | | | 382/224 | |
| 2006/0222211 A1* | 10/2006 | Olivo, Jr. | G06K 9/00885 | |
| | | | 382/115 | |
| 2007/0127787 A1* | 6/2007 | Castleman | G06K 9/00248 | |
| | | | 382/118 | |
| 2008/0019573 A1* | 1/2008 | Baltatu | G06F 21/32 | |
| | | | 382/115 | |
| 2011/0191329 A1* | 8/2011 | Petrov | G06K 9/00885 | |
| | | | 707/723 | |
| 2012/0070041 A1* | 3/2012 | Wang | G06F 21/32 | |
| | | | 382/118 | |
| 2012/0139703 A1* | 6/2012 | Szoke | G06F 21/32 | |
| | | | 340/5.83 | |
| 2012/0169463 A1* | 7/2012 | Shin | G06F 21/32 | |
| | | | 340/5.82 | |
| 2012/0314962 A1* | 12/2012 | Holland | G06F 16/583 | |
| | | | 382/218 | |
| 2013/0039590 A1* | 2/2013 | Yoshio | G06K 9/6234 | |
| | | | 382/218 | |
| 2014/0188770 A1* | 7/2014 | Agrafioti | A61B 5/117 | |
| | | | 706/13 | |
| 2014/0279858 A1* | 9/2014 | Stephanson | G06F 16/24575 | |
| | | | 707/609 | |
| 2014/0354405 A1* | 12/2014 | Kocher | G06F 21/32 | |
| | | | 340/5.82 | |
| 2015/0154462 A1* | 6/2015 | Rosenkrantz | G06K 9/6215 | |
| | | | 348/77 | |
| 2015/0363636 A1* | 12/2015 | Tate | G06K 9/00295 | |
| | | | 382/103 | |
| 2016/0154994 A1* | 6/2016 | Kim | G06K 9/00248 | |
| | | | 382/118 | |
| 2016/0162553 A1* | 6/2016 | Stephanson | G06F 16/24575 | |
| | | | 707/769 | |
| 2017/0091570 A1* | 3/2017 | Rao | G06K 9/00979 | |
| 2017/0134375 A1* | 5/2017 | Wagner | H04L 63/0853 | |
| 2017/0302661 A1* | 10/2017 | Connell, II | H04L 63/0861 | |
| 2017/0344810 A1* | 11/2017 | Askari | G06K 9/00288 | |
| 2017/0358148 A1* | 12/2017 | Kayhani | G07B 15/02 | |
| 2018/0157896 A1* | 6/2018 | Kocher | G06K 9/00288 | |
| 2018/0189551 A1* | 7/2018 | Ranganath | G06K 9/00288 | |
| 2018/0218288 A1* | 8/2018 | Liu | G06F 19/00 | |
| 2018/0225307 A1* | 8/2018 | Kocher | G06K 9/00288 | |
| 2018/0357401 A1* | 12/2018 | Jin | H04L 29/06809 | |
| 2020/0143035 A1* | 5/2020 | Beatson | G06K 9/3283 | |
| 2020/0364479 A1* | 11/2020 | Tseng | G06K 9/00295 | |

* cited by examiner

GROUP IDENTIFICATION DEVICE

CROSS-REFERENCE TO RELATED APPLICATIONS

This application claims priority from U.S. Provisional Patent Application No. 62/499,921 filed on Feb. 8, 2017, the contents of which are incorporated herein by reference, it its entirety.

BACKGROUND

Field of the Invention

This invention relates to computerized biometric matching used to compare images and other identification such as height, tattoos, birthmarks, password, fingerprints, etc. for identification of individuals within a group.

Description of the Related Art

Identifying whether or not a person is in a group normally involves showing a badge, uniform or some sort of visual signature. The state of the art advances the visual signature to include fingerprints, iris, facial recognition or other biometric identification. In the current state of the art, facial matching technology generally utilizes one photograph. Many devices will perform a match and present a photograph to a guard so that the guard can look at the photograph and see if it is a proper match. This operation in the current state of the art has three disadvantages. The first disadvantage is that it requires the guard to make a decision from an image on a small screen. The second disadvantage is that the algorithm used to identify a match cannot have a very high match rate, because matching scores from a single livescan to a single face are low due to the varying three-dimensional angles of the face taken during a live-scan. The third disadvantage is that when faces are placed on the device, there's a risk of compromising the device and the database. (For discussion purposes, mobile devices in operational environments can have an average state-of-the-art match rate of 0.90; a very high match rate of 0.95, and an ultra-high match rate of 0.99). In today's environment, there are significant security concerns regarding database compromises. If you have a collection of fingerprints, iris, or faces, on a device, and the device is compromised, you potentially have a loss of personal information, which could be damaging. In addition, because the information is biometric information, the individual cannot change their biometric information. This problem is even more serious when your group consists of valuable individuals such as intelligence officers, security officers, law enforcement officers, or individuals with covert identities, which are of value to an opposing group. Current templates have been developed by humans that identify minutiae points; places on the face; ridges and minutiae points on a fingerprint; facial features and distances on a face, such as the distance between irises; and minutiae points taken off of the iris. It is possible to reconstruct, from a template, a biometric that could be used to defeat conventional systems.

SUMMARY

A device and method for achieving a high probability of obtaining a match for identifying individuals in a particular group, is disclosed. This device and method includes two stages. The first stage compares the biometric template against personnel in an authorized group with a high probability of match threshold. In the second stage, if no match is made in the authorization group, a search would be conducted against a second group, such as a watch list, with the same or lower probability of match threshold. The two different thresholds can be achieved by varying parameters on one search engines and threshold setting, or can be achieved by two or more independent search engines and threshold settings.

The group identification device is a new approach to facial matching, whereby very high match rates are achieved, allowing a "lights-out" match and providing an indication that the person is or is not a member of the group, without having to store or present a photograph. The group identification device centers on using a biometric that was developed by machine-learning. It is nearly impossible to reconstruct a biometric from a machine learning template. The compromise of a machine learning template database would have very little value in attempting to reconstruct who is in the group. The group identification device would allow a guard the ability to check an individual and receive an indication that this person is in the group. Two preconditions are required to make this device reliable when using facial recognition. One, it would require numerous images of a person in the database. When an individual approaches the livescan device and an image is taken, a very high false accept level could be established since the livescan image would have a better probability of matching numerous reference images in a database. For example, if there are 90 photos of an individual, there would be different face poses: right, left, up, down, etc. When the livescan is taken and the person's face is a good match, it has a high probability of matching one of the 90 photos. The group identification device looks for one high score match above the threshold to determine that individual is in the group, and the device would indicate that. In response to their being a low match rate, set on the device, there could be numerous false acceptances, which mean that an identified "match" or "green light" could be somebody that is not in the group.

In an exemplary embodiment, a group identification device that identifies whether a person is a member of a select group and uses selected biometric data templates that are not prone to reverse engineering to reconstruct the person's biometric is provided. The group identification device includes a non-reverse engineering prone biometric template database of a select group; the biometric template database contains multiple biometric templates from each member of the select group; a mobile computing device comprising: a computer system, biometric collection hardware and software, a display screen, and one or more biometric matching algorithms; textual data linked to the biometric template; and an adjustable match score setting that allows ultra-high match rates for the select group.

The group identification system further includes an independent watch list database and matching software computing components including photos of persons on the watch list group; biometric templates of the watch list group; and at least one biometric matching algorithm. In the group identification system, the biometric for the select group may be based on facial photos and the non-reverse-engineering-prone biometric template is developed through machine learning or artificial intelligence. The independent watch list and matching software computing components further includes an independent and adjustable biometric template match rate. The independent watch list and the matching software computing components further includes textual data including elimination data, confirmation data, warning data and miscellaneous data. The mobile computing device further includes an initiating device for taking new photos or new videos. The mobile computing device further comprises a notification screen including indicators for a match that has been identified, an indicator which indicates that a match has not been made, and an indicator which indicates that a match has been made against an individual on a watch list. In response to a match of an individual in the select group is not made, a match watch list is used to determine whether a match can be made with a person on a watch list. The biometric template database includes a select group database and a watch list database. The watch list database includes one or more of photos, templates, warnings, elimination data, confirmation data, miscellaneous data and special instructions. The select group database includes one or more of non-sensitive data; non-reconstructable templates; elimination data; confirmation data; passwords, and time and geo stamp information.

Another exemplary embodiment provides a group identification device that identifies whether a person is a member of an authorized group and uses at least a authorized group database including selected biometric data templates that are not prone to reverse engineering in order to reconstruct the person's biometric, the group identification device includes the authorized group database having a non-reverse engineering prone biometric template database of the authorized group; the biometric template database contains multiple biometric templates from each of the members of the authorized group; a mobile computing device comprising: a computer system, biometric collection hardware and software, display screen, and biometric matching algorithm; the authorized group database includes textual data linked to the biometric template; and an adjustable match score setting that allows ultra-high match rates.

The group identification system further includes an independent watch list and matching software computing components including photos of persons on the watch list group; biometric templates of the watch list group; and at least one biometric matching algorithm. The biometrics in the authorized group database is based on facial photos, and the non-reverse-engineering-prone biometric template is developed through machine learning or artificial intelligence. The independent watch list and matching software computing components further comprise an independent and adjustable biometric template match rate. The independent watch list and the matching software computing components further comprises textual data including elimination data, confirmation data, warning data and miscellaneous data. The mobile computing device further comprises an initiating device for taking new photos or new videos. The mobile computing device further comprises a notification screen including indicators for a match that has been identified, an indicator which indicates that a match has not been made, and an indicator which indicates that a match has been made against an individual on a watch list. The independent watch list and the matching software computing components further comprises textual data including elimination data, confirmation data, warning data and miscellaneous data.

A group identification method for identifying whether a person is a member of an authorized group and uses at least an authorized group database including selected data templates which are not prone to reverse engineering in order to reconstruct the person's biometric, the method including the steps of providing the authorized group database with a biometric template database of the authorized group; providing the biometric template database with multiple biometric templates from each member of the authorized group; providing a mobile computing device including a computer system, biometric collection hardware and software, a display screen, and at least one biometric matching algorithm; providing the authorized group database with textual data linked to the biometric template database; and providing the mobile computing device with an adjustable match score setting that provides ultra-high match rates.

BRIEF DESCRIPTION OF THE DRAWINGS

FIG. 4 depicts the process that a security guard follows when evaluating someone coming in.

Figure 1:
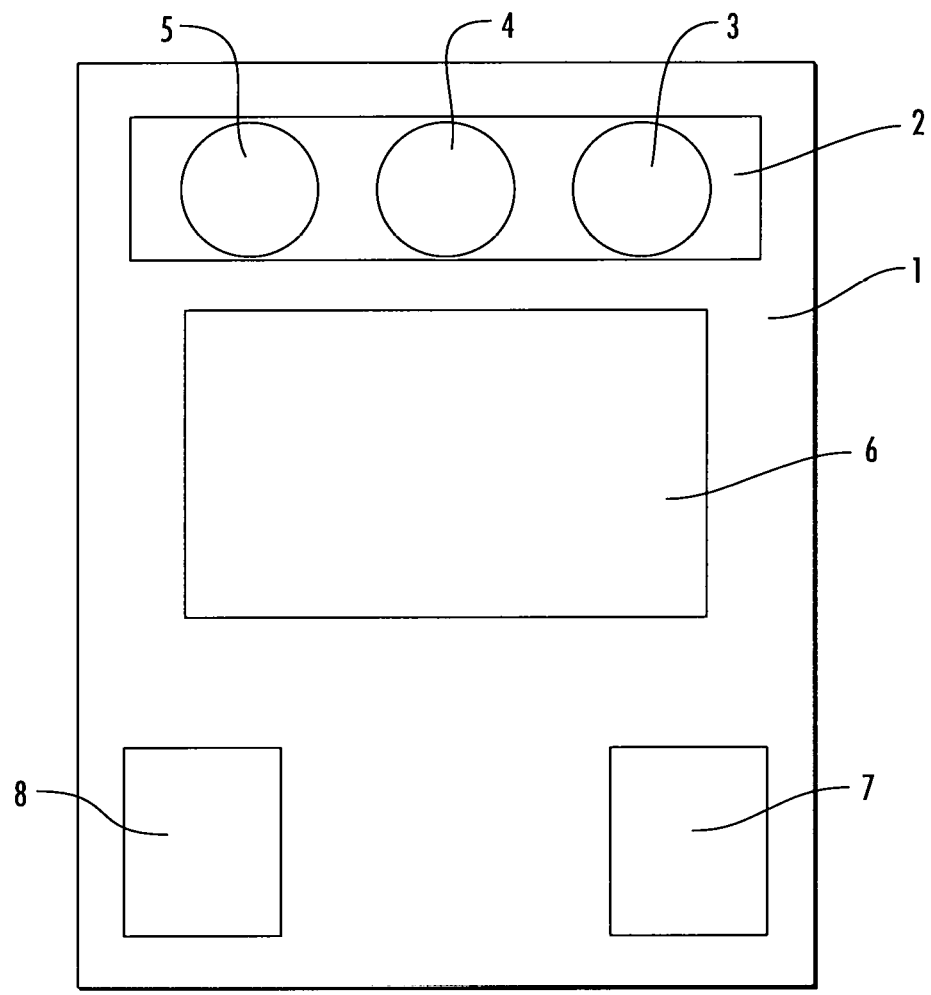
FIG. 1 illustrates a front view of the mobile device with display screens.

DRAWING REFERENCE NUMERALS 1 mobile unit
2 notification screen
3 match/authorized
4 no match
5 match/watch list
6 photograph display screen
7 take photograph/video button
8 run/compute video/photograph button
9 camera/biometric collector
10 software computer components
11 authorized database templates
12 elimination, confirmation, and/or password data
13 matching algorithm
14 input template
15 watch list data
16 elimination, confirmation for watch list data
17 watch list photos
18 watch list textual and alert data
19 photograph taken by the mobile device
20 matching algorithm determining if there is a match to the authorized group
21 matching algorithm to determine if there's a match to the watch list
22 displays no match on watch list
23 displays there is a match on the watch list
24 the match display photos
25 match display of elimination data
26 match display of confirmation data
27 policy actions for the guard to take for a match
28 policy actions for the guard to take for no match
29 displays the authorized group match
30 allow access display
31 display of confirmation data
32 display of the password
33 policy actions for no match of confirmation data or password
34 authorized group database
35 high volume of minor movement templates
36 match rate at ultra-high threshold
37 high-speed search algorithms with small templates
38 matches on the authorized group 39 no matches on the authorized group
40 watch list
41 match rate threshold on the watch list
42 watch list photograph match
43 watch list elimination data
44 watch list confirmation data
45 non-sensitive data on the group
46 non-re-constructible templates
47 optional elimination data
48 optional confirmation data
49 optional password
50 optional date/time/geo stamp on group
51 watch list photos
52 watch list templates
53 watch list warnings
54 watch list elimination data
55 watch list confirmation data
56 miscellaneous data and special instructions

DETAILED DESCRIPTION OF THE
EXEMPLARY EMBODIMENTS

FIG. 1 depicts a front view of a mobile computing device 1 capable of capturing photos/videos and matching them against reference data. The mobile device contains a notification screen 2, which indicates one of three outcomes: a match has been made against an authorized individual 3, no match has been made 4, or a match has been made against a watch list 5. The device also includes a photograph/video screen 6. The mobile computing device additionally includes a button for initiating 7 and processing 8 of a new photograph/video.

In order to identify whether someone is in the authorized group or the watch list, the guard would simply point the mobile computing device 1 with camera 9 (see FIG. 2) and initiate a photograph by pressing the button 7. If the photograph can be displayed on screen 6, or can be automatically processed for matching, the guard would press button 8 to begin the matching process, through a reference photo/video database 61 and a processor, as described, infra. The guard could take and process one or more photos/videos based on the device settings. A return of a match from the processing would be shown as a match with the authorized list on indicator 3. If no match is obtained, the lack of a match will de indicated on indicator 4. In the event a match is made from the watch list, this match from the watch list will be indicated by indicator 5. The database includes reference identification of authorized individuals as well as individuals on a watch list. In the case of multiple photos being taken by the guard, the guard may press processing button 8 to process the next photograph or video. In the case where all photos are on the authorized list, the device could indicate one green or three green flashes, although other types of indications could be used, as would be understood by an artisan. A yellow indication from the processing would indicate to the guard that a match was not made. If the guard were to get two flashing greens or one yellow, which would indicate that two individuals with the green flashing light are on the authorized list and the individual with the flashing yellow light is not. The flashing lights could be automatically sequenced to match the order in which the photos were taken. In the case of an authorized list match, the indicator 3 could display a green light or textual data saying match or a different type of indicator to the guard that would indicate that this person is authorized. A match is indicated by an appropriate threshold score based on the comparison of the photo/video with the information in the database. Should the device not find a match at the appropriate threshold score on the authorized list, the device will pass the photograph taken to the watch list algorithm where the watch list will then compare templates based on a lower match score. Should a match occur, the device 1 will then display one or more matches above the threshold on screen 6. The device 1 can also display elimination data or confirmation data and additional data on the device 1 to the guard: elimination data or personal attributes that must match for the person to be considered to be authorized on the list of authorized individual. An example is a person's height. If the elimination data said 5'6" and the person in front of the guard is 6'2" the guard would automatically eliminate the person from being considered a match. Elimination data is data such as scars, tattoos, hair color, height, etc. that someone could not be eliminated with, but it would assist the guard in confirming that this is indeed a match. The mobile computing device includes a computer system (not shown), biometric collection hardware and software, biometric matching software (FIG. 3), and display screen 6.

Figure 2:
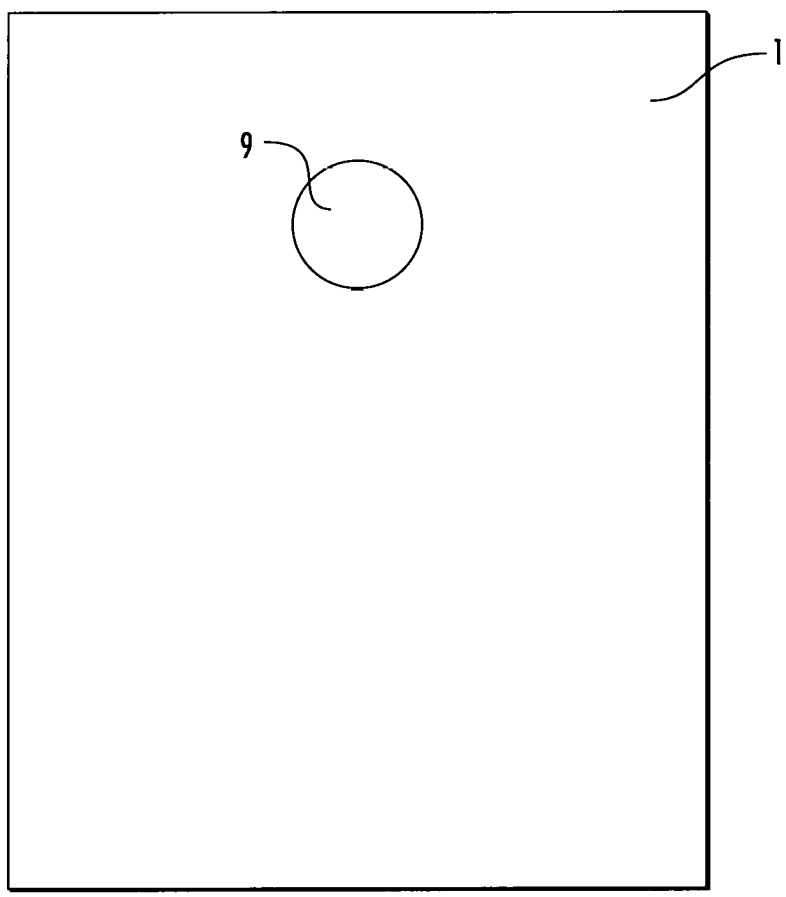
FIG. 2 illustrates a rear view of the mobile device, depicting a camera lens.

FIG. 2 depicts the biometric collector, i.e., camera 9, on the mobile computing device 1. As illustrated, the camera is located on the rear of the mobile computing device, but could be located elsewhere, as would be understood by an artisan.

Figure 3:
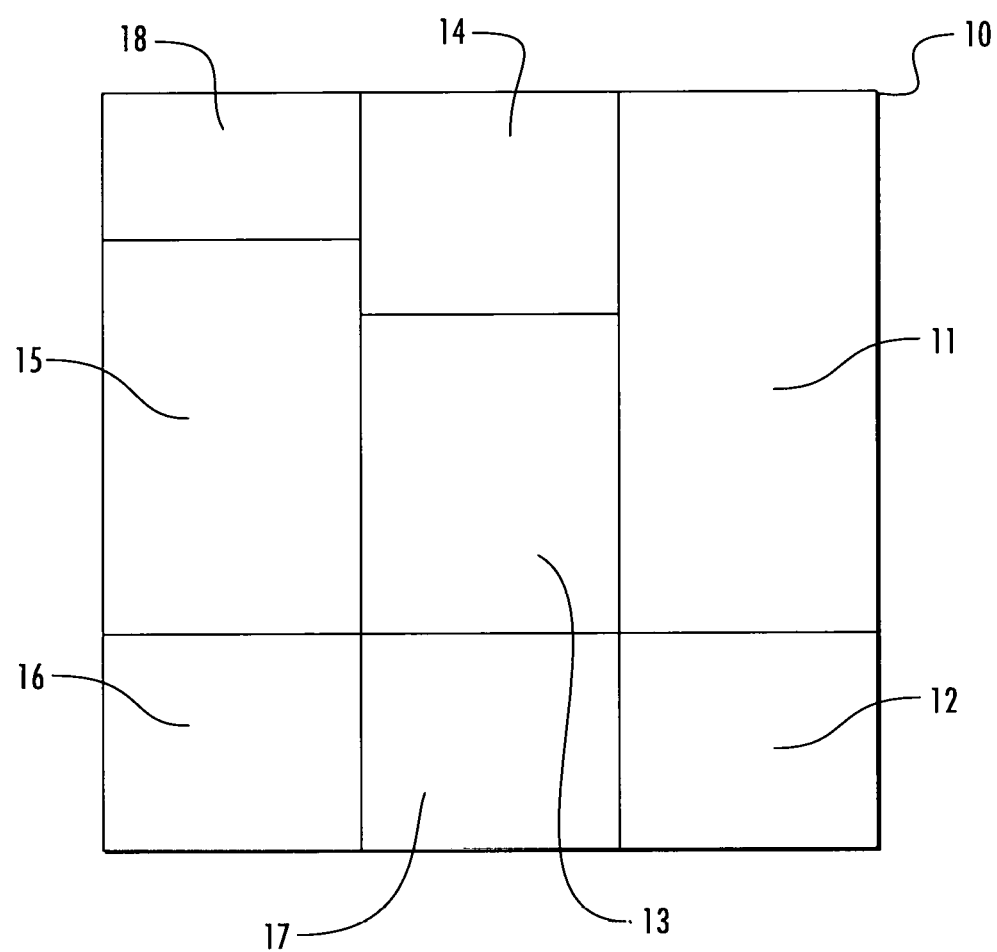
FIG. 3 illustrates an overview of the system architecture of the computing processor.

FIG. 3 depicts the software computing components 10 that are envisioned to be contained on the mobile computing device 1. These components could also be stored or operated on external servers or computers connected by wi-fi or other electronic communications to the mobile computing device. The components comprise the authorized database templates 11; elimination, confirmation or password database 12; and the biometric matching algorithm 13. The biometrics for matching a member from the authorized group based on photos and/or videos, i.e., a select group, is based on facial photos and non-reverse-engineering-prone biometric templates 14 and is developed through machine learning or artificial intelligence. The image or images collected by the biometric mobile computing device 1 would convert the image to a template and input this image or images to a template 14 into the software computing components 10. The matching algorithm 13 would compare the input template 14 against the authorized database 11. Should there be no determination of a match by the software computing components, the matching algorithm 13 would then compare the input template 14 to the watch list 15 to determine whether or not there is a match. In the use of the authorized database, the match rate has an ultra-high threshold, and most subjects are expected to be in this group. The biometrics used for the watch-list when there is no match with the authorized group has a low threshold for the match determination. In either case, in response to a match being determined, the mobile computing device 1 elimination and confirmation data (tattoos, height, etc.) could be presented. In the case of a match with the authorized database templates 11 the elimination, confirmation or password data 12 would also be displayed. Password data is information that an authorized individual would have. In addition, in the case of an authorized database match, the watch list would not be searched. In the case of a match against the watch list, the watch list elimination confirmation data 16 would be displayed along with the watch list photos 17 and any additional watch list textual and alert data 18. The alert data can also trigger a response on the mobile computing device 1 such as a vibration, tone or color alert, etc. This alert can also be indicated on the photograph presented from among watch list photos 17 when displayed on the mobile computing device 1. In the case where the guard is using the device on everyone entering a facility, most of the matches will be on the authorized list and the watch list will not be searched. The high match algorithm rate established on the authorized list will rapidly match and allow individuals to pass. The lower match rate on the watch list will present a higher number of matches requiring the guard to evaluate and make decisions regarding match or no match. A high percentage of the time should result in matches on the authorized list. Rare cases should go to the next highest probability as a no match on either list. The guard would have the option to retake the photograph to see if he/she can achieve a match on the authorized list, and in response to no match being achieved, the guard would have to revert to policy actions based upon on two attempts and no match.

Figure 4:
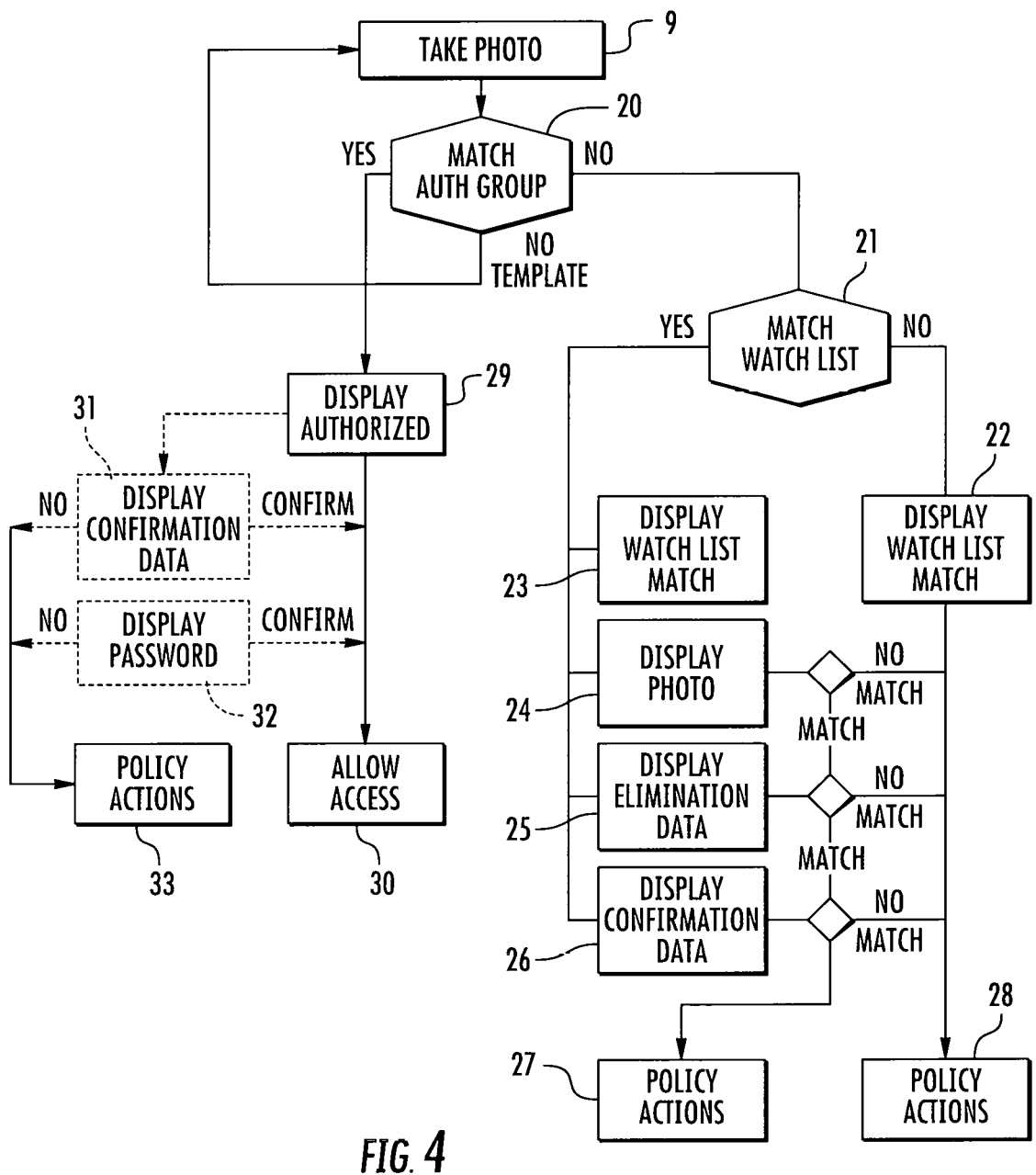

FIG. 4 depicts the process for taking a photograph and authorizing the subject. The user takes the photograph utilizing the device's built-in camera 9, and the photograph is then matched against a set of reference images 20 (the individuals authorized access), or the "authorization group." In response to a match being made, the device will display an indication at step 29 that an authorization was made. Optionally, the mobile device will display confirmation data 31 (such as specific physical characteristics, i.e., hair color, height, any missing limbs, etc.). Optionally, the device can also display a challenge password in step 32, with which the user can request the subject recite the password. In response to the subject citing the password, authorization is granted 30. In response to the subject being unable to cite the password or other confirmation data, access is denied, as indicated at step 33. Conversely, FIG. 4 also depicts the process when a match is not made against the authorization group 20. When this occurs, as in step 20; the photograph is then matched against a watch list 21. In response to a match being made against the watch list 21, the device will display confirmation of this outcome in step 23. Consequently, the mobile device 1 will display the reference photograph in step 24 to which the subject photograph matched. The guard can then accept this outcome and move to the next step, or determine that the photograph does not match the individual in front of him/her, and proceed to a policy action of step 28 (i.e., hold for questioning, release, etc.). In addition to the photograph match, the device will display elimination data specific to that reference individual as shown in step 25, with which the user or guard can further substantiate whether they indeed have a valid match. (Elimination data refers to some characteristic of the individual that is not easily alterable, such as a physical deformity, scar, additional or missing digit or limb, etc.) In response to the reference individual meeting the elimination criteria, the device will display confirmation data of the subject at step 26 to facilitate yet another layer of confidence that the reference information, has indeed matched the subject. (Confirmation data refers to some characteristic of the individual that is less difficult to alter, such as hair color, eye color, weight, etc.) If at any time, the reference individual does not meet any one of the above criteria, the user can default to a standard set of policy actions 28 to adjudicate the subject's status (i.e., deny access, question further, etc.).

Figure 5:
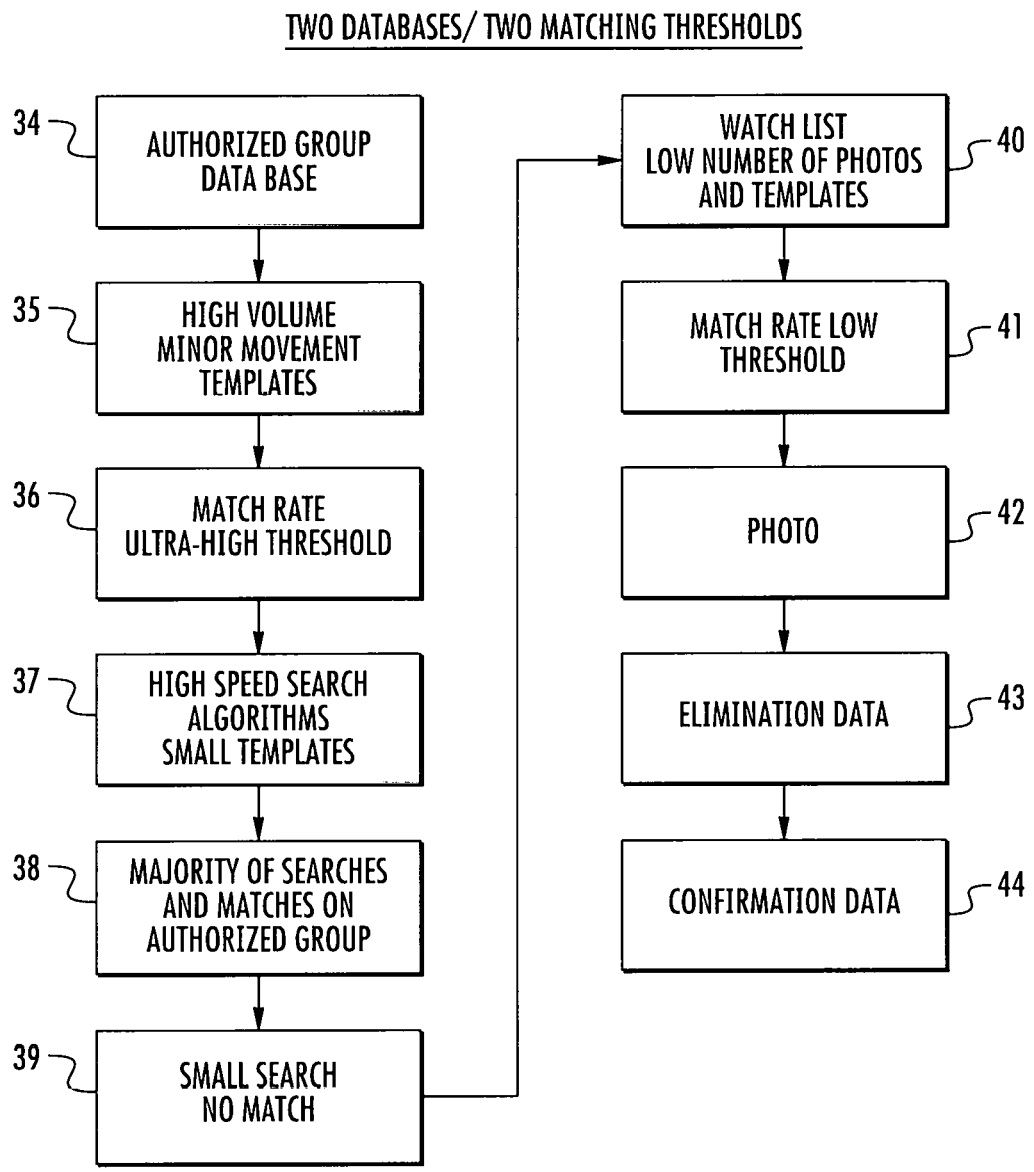
FIG. 5 depicts information flow through two databases with two different matching thresholds.

FIG. 5 depicts the method for the user to search individuals against two different databases (authorized group 34 and watch list 40), each with its own matching threshold, which are different from each other. The first database, the authorized group 34, contains a high volume of minor movement templates, at step 35. The match rate for this database is intentionally set to an ultra-high threshold, as shown in step 36. High-speed search algorithms with small template sizes of step 37 are then used to facilitate searches against the authorized group database 34. In theory, these parameters will produce a small percent of no-match results as shown in step 39. The second database 40, the watch list, contains a low number of photos and templates. Its match rate in step 41 is intentionally set to a low threshold. Once a match is made, a photograph 42 along with elimination data as shown in step 43 and confirmation data, shown in step 44 are displayed.

Figure 6:
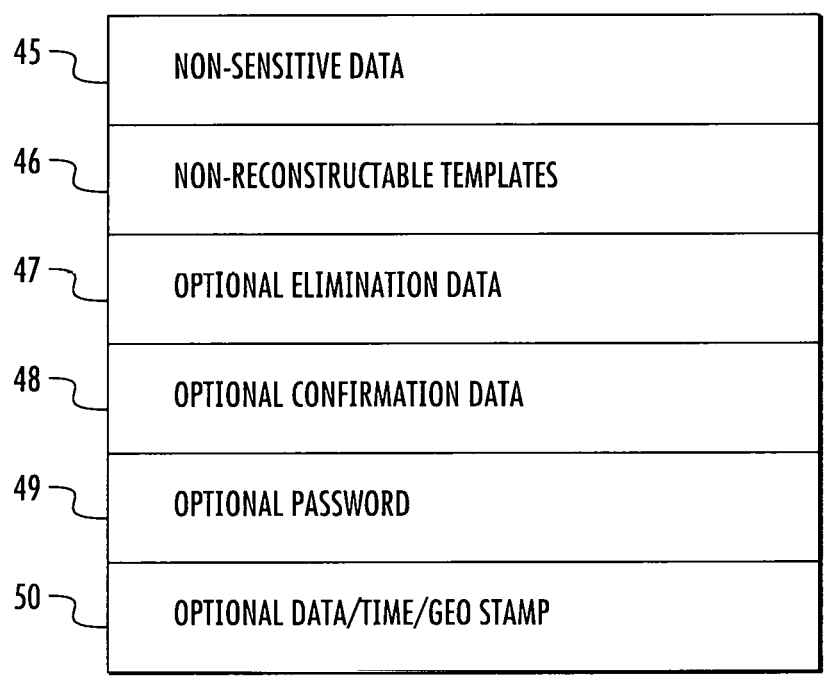
FIG. 6 depicts the data that would be returned in response to a match occurring.

FIG. 6 depicts several possible elements of the authorized group database 34. It consists of non-sensitive data 45, non-re-constructible templates 46, and a series of optional data sets: optional elimination data 47, optional confirmation data 48, optional password 49, and date/time/geo-location stamp 50.

Figure 7:
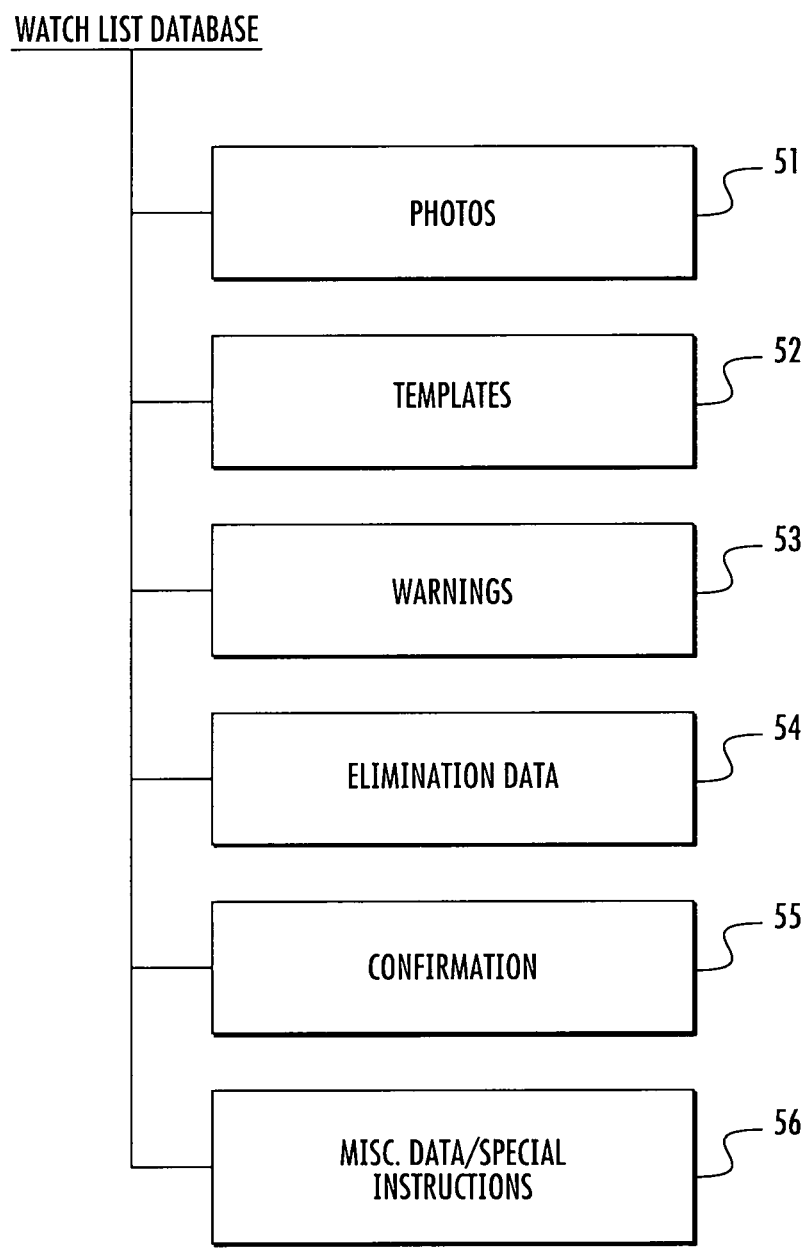
FIG. 7 depicts a composition of the watch list database.

FIG. 7 depicts the elements of the watch list database. The watch list database includes photos 51, templates 52, warnings 53, elimination data 54, confirmation data 55 and miscellaneous data/special instructions 56.

Although exemplary embodiments have been shown above, other exemplary embodiments can readily be used as would be understood by an artisan. The exemplary embodiments should not be considered to be limiting of the invention in any way, as the invention is only limited by the scope of the appended claims.

The invention claimed is:

1. A method for identifying whether a subject is a member of an authorized group using at least an authorized group database including biometric templates which are not prone to reverse engineering, the method comprising the steps of:
   in a first stage:
      capturing a biometric image using a camera;
      a first comparing step for comparing, using a computer system, the captured biometric image to the biometric templates of the authorized group database, wherein each member represented in the authorized group database has multiple said biometric templates;
      determining, using said computer system, a match if the result of said first comparing step exceeds a first match threshold, wherein said first match threshold is an adjustable match threshold;
   in a second stage:
      in response to a result of no match with a member in the authorized group database in said first comparing step, performing a second comparing step, using said computer system, for comparing said captured biometric image with a watch list database, which is different than said authorized group database; and
      determining, using said computer system, a match if the result of the second comparing step exceeds a second match threshold, wherein said second match threshold is lower than said first match threshold.

2. The method of claim 1, further comprising:
   displaying, on a display, a first indicator for indicating a match to the authorized group;
   displaying, on said display, a second indicator for indicating no match to the authorized group; and
   displaying, on said display, a third indicator for indicating a match to the watch list database.

* * * * *